United States Patent [19]

Hernqvist

[11] 4,008,445
[45] Feb. 15, 1977

[54] ULTRA-VIOLET GAS LASER
[75] Inventor: Karl Gerhard Hernqvist, Princeton, N.J.
[73] Assignee: RCA Corporation, New York, N.Y.
[22] Filed: Sept. 4, 1975
[21] Appl. No.: 610,182
[52] U.S. Cl. .................. 331/94.5 D; 331/94.5 G; 330/4.3
[51] Int. Cl.² ........................................ H01S 3/03
[58] Field of Search .................... 331/94.5; 330/4.3
[56] References Cited
UNITED STATES PATENTS
3,787,781  1/1974  Medicus .................. 331/94.5 G Primary Examiner—William L. Sikes
Attorney, Agent, or Firm—Glenn H. Bruestle; George E. Haas

[57] ABSTRACT

A gas laser tube has two regions, one characterized by a high electron temperature and the other by a low electron temperature. Included in the tube is means for establishing a space charge double sheath to separate the two regions. A mirror is located at each end of the region of low electron temperature.

9 Claims, 4 Drawing Figures

ULTRA-VIOLET GAS LASER

BACKGROUND OF THE INVENTION

The present invention relates to gas laser discharge tubes and particularly to those devices which operate in the ultraviolet region. Although gas lasers are well known in the art, to date no continuous wave laser operation has been reported below 3250 A. It has been hypothesized however, that several materials have energy transitions which will produce lasing below this level. Radiation below 3250 A has particular interest in biochemistry.

SUMMARY OF THE INVENTION

A gas laser has a tube which has two regions and a means for establishing a space charge double sheath between the two regions. The space charge double sheath creates a potential barrier between the two regions. One region, as a result, has a high electron temperature while the other region has a low electron temperature. This difference in electron temperature reduces the generation rate of metastable gas atoms in the low temperature region which permits lasing below 3250 A within this region. A mirror is positioned at each end of the low temperature region.

DETAILED DESCRIPTION OF THE INVENTION

Figure 1:
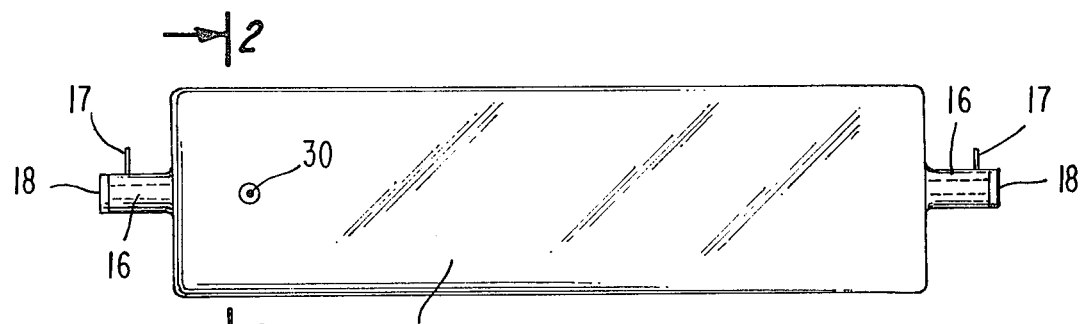
FIG. 1 is a side view of one embodiment of the present invention.
Figure 2:
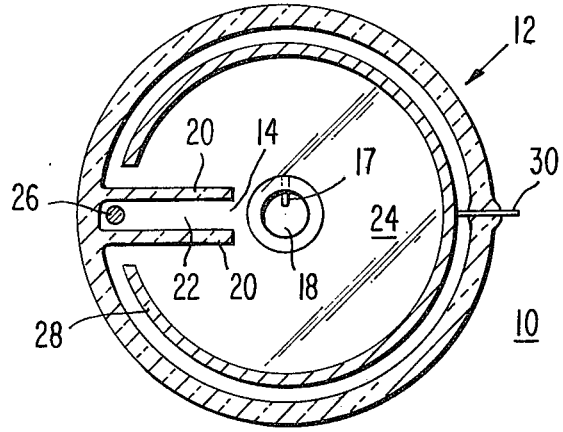
FIG. 2 is a transverse cross-sectional view taken on line 2—2 of FIG. 1.

With initial reference to FIGS. 1 and 2 a gas laser, generally designated as 10, has a hollow cylindrical glass tube 12. Extending from each end of the tube 12 is a capillary tube 16 having a mirror 18 mounted over its exposed end. The capillary tubes 16 are in alignment. Within each capillary tube 16 is an auxiliary anode 17. The auxiliary anode 17 and the tube 16 provide well known cataphoretic confinement sections which prevent the metal vapor from contaminating the mirrors 18. Extending from the inner surface of the tube 12 toward the center of the tube are two closely spaced walls 20. The walls 20 extend along approximately the full length of the tube 12. Although the walls 20 of the embodiment shown in FIG. 2 are substantially parallel to one another, they may extend radially inward from the interior surface of the tube 12. The walls 20 divide the interior of the tube 12 into a first region 22 located between the walls and a second region 24 comprising the remainder of the interior of the tube 12. The two regions 22 and 24 are substantially parallel to the longitudinal axis of the tube 12. The mirrors 18 are located at the ends of the second region 24. The two regions open into one another at a narrow opening 14 at the exposed end of the walls 20. The spacing between the walls 20 at the opening 14 should not be greater than about one-third the diameter of the tube 12. An anode 26 is located within the first region 22 near the junction of the two walls 2o and the interior surface of the tube and extends for the full length of the wall 20. A cylindrical cathode 28 having a C-shaped cross section is located within the second region 24 extending for substantially the full length of the tube. The cathode is connected to a lead 30 which extends through the wall of the tube 12.

The operation of the present invention will be described in detail with specific reference to the embodiment shown in FIGS. 1 and 2. The laser tube 12 is filled with a gas, such as helium, and a metal vapor. As noted by G. J. Collins in the Journal of Applied Physics, Volume 44, Number 10, October 1973 at page 4633; magnesium, cadmium, silver, lead and gallium have energy transitions which will support lasing in the ultraviolet region below 3250 A. Either of these elements, for example, may be used as the metal vapor in the present discharge tube. During a gas discharge within the tube 12, the cataphoretic effect cause the metal vapor to be attracted to the anode. This effect reduces the metal vapor pressure in the first region 22 so that the gas discharge within this region is caused by the helium gas. The gas discharge excites the helium gas within the first region 22 to both metastable and ionization energy levels.

The narrow opening 14 between the first and second regions 22 and 24 constricts the current flow between the cathode and the anode. The constriction of the current flow results in the formation of a space charge double sheet between the two regions 22 and 24. As is well known in the art, a space charge double sheath is essentially a difference in plasma potential. As a result, the first region 22 has a high electron temperature and the second region 24 has a lower electron temperature. The potential barrier between the two regions 22 and 24 causes the acceleration of helium gas ions into the second region 24 and electrons into the first region 22. Any metastable helium atoms which enter the second region 24 are quickly de-excited by the cool electrons in the second region. Thus, the second region 24 has a high helium ion density and a low metastable helium atom density. The helium ions, which were generated in the first region 22 and injected into the second region 24, excite the metal vapor causing lasing between the mirrors 18 located at the ends of the second region 24.

It is theorized that the reasons that lasing below 3250 A has never been achieved, is that the energy necessary to generate lasing below this level is greater than the energy needed to ionize the metastable gas atoms which are present in the tube. Therefore, the energy from the gas discharge, which would normally generate the lasing, is instead absorbed by the gas raising the energy of the metastable atoms to the ionization energy level. It is proposed that the photoionization of the metastable gas atoms may account for the absence of the shorter wavelength lasers. The present invention employs a partitioned discharge tube which isolates the metastable atoms from the portion of the tube in which the lasing occurs.

Figure 3:
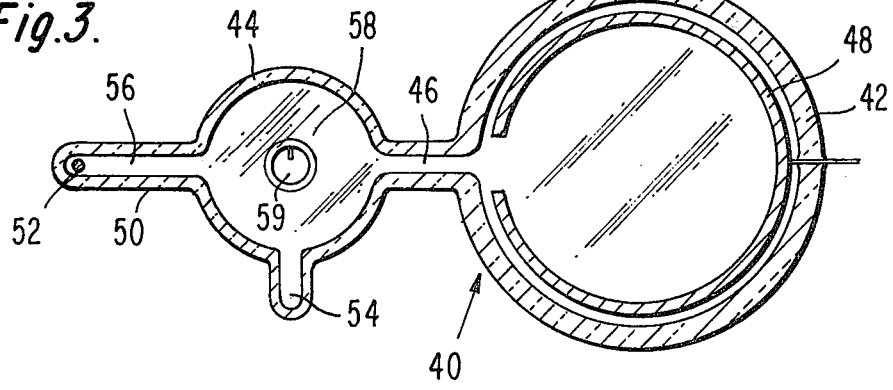
FIG. 3 is a transverse cross-sectional view of a second embodiment of the present invention.

Another embodiment of the novel invention described herein is shown in FIG. 3. The laser tube generally designated as 40 includes a first cylinder 42 and a second cylinder 44. The two cylinders are parallel to one another and are of approximately equal lengths. A passageway 46 joins the two cylinders 42 and 44 extending over substantially their entire length. The first cylinder 42 contains a cylindrical cathode 48 which extends through most of the length of the first cylinder. The first cylinder 42 permits the use of a cathode having a large surface area. An external protuberance 50 extends from the entire length of the second cylinder 44 and is opposite the passageway 60. The protuberance 50 defines the high electron temperature region 56 of the laser tube 40 and contains an anode 52. The second cylinder 44 defines the low electron temperature region 58 and may have an external pocket 54 to contain a source of the metal vapor for the laser. The constriction in the discharge path at the entrance of the high temperature region 56 generates a space charge double sheath which separates the two temperature regions. A mirror 59 is at each end of the second cylinder 44. The device shown in FIG. 3 operates in essentially the same manner as the embodiment shown in FIGS. 1 and 2.

Figure 4:
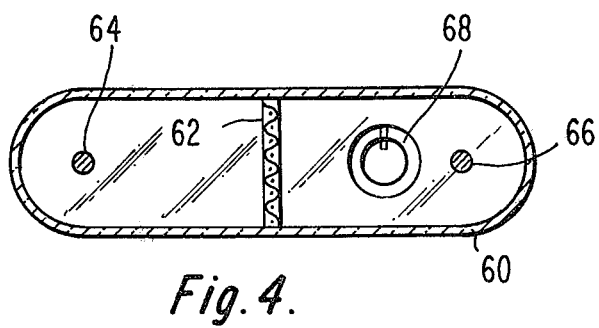
FIG. 4 is a transverse cross-sectional view view of a third embodiment of the present invention.

A third embodiment of the present invention is shown in FIG. 4. A laser tube 60 has an oval cross sectional configuration. A screen grid 62 extends for approximately the full length of the tube 60 and divides the tube in half longitudinally. An anode 64 and a cathode 66 are located in different halves of the tube. In this embodiment, the grid 62 provides the means for constricting the current flow and establishing a space charge double sheath which separates the halves of the tube. As in the other embodiments, the space charge double sheath separates a region of high electron temperature, the half with the anode from the region of lower electron temperature, the half with the cathode. The grid may be biased, if necessary, in order to obtain the desired space charge double sheath. A mirror 68 is at each end of the half of the tube which contains the cathode 66.

I claim:

1. A gas laser comprising:
   a tube having two regions opening into one another;
   a laser gas within the tube;
   means for establishing a space charge double sheath between the regions to provide a high electron temperature in one region and a low electron temperature in the other region; and
   a mirror located at each end of the region of low electron temperature.

2. The gas laser as in claim 1 wherein the two regions are parallel and extend for substantially the full length of the tube.

3. The gas laser as in claim 1 wherein the tube contains helium and a metal vapor selected from the group consisting of magnesium, cadmium, silver, lead and gallium.

4. The gas laser as in claim 1 wherein the means for establishing a space charge double sheath comprises two spaced walls extending over substantially the entire length of the tube from the interior surface toward the center of the tube so as to define one region between them, an anode in one region, and a cathode within the other region.

5. The gas laser as in claim 4 wherein the distance between the two walls at the opening between the two regions is not greater than about one third the tube's diameter.

6. The gas laser as in claim 1 wherein the means for establishing a space charge double sheath comprises:
   a screen grid between the two regions;
   an anode within one region; and
   a cathode within the other region.

7. The gas laser as in claim 5 wherein the screen grid is biased.

8. The gas laser as in claim 1 including a cataphoretic confinement section in front of each mirror.

9. The gas laser as in claim 1 wherein the tube comprises:
   a first and a second cylinder parallel to one another;
   a passageway connecting the first and second cylinders over their entire length;
   a protuberance extending from the entire length of the second cylinder region being within the protuberance and the other region being within the second cylinder;
   a cathode within the first cylinder;
   an anode within the protuberance; and
   a mirror located at each end of the second cylinder.

* * * * *